(12) United States Patent
Kerselaers (10) Patent No.: US 10,566,690 B1
(45) Date of Patent: Feb. 18, 2020

(54) NEAR-FIELD INDUCTION VOLTAGE BOOST CIRCUIT

(71) Applicant: NXP B.V., Eindhoven (NL)

(72) Inventor: Anthony Kerselaers, Herselt (BE)

(73) Assignee: NXP USA, Inc., Eindhoven (NL)

( * ) Notice: Subject to any disclaimer, the term of this patent is extended or adjusted under 35 U.S.C. 154(b) by 0 days.

(21) Appl. No.: 16/155,219

(22) Filed: Oct. 9, 2018

(51) Int. Cl.
　　*H01Q 1/50* (2006.01)
　　*H01Q 7/06* (2006.01)
　　*H01Q 9/16* (2006.01)

(52) U.S. Cl.
　　CPC .............. *H01Q 1/50* (2013.01); *H01Q 7/06* (2013.01); *H01Q 9/16* (2013.01)

(58) Field of Classification Search
　　CPC .............. H01Q 1/50; H01Q 7/06; H01Q 9/16
　　USPC ........................................................ 343/747
　　See application file for complete search history.

(56) References Cited

U.S. PATENT DOCUMENTS

| 5,296,866 A | 3/1994 | Sutton | |
| 6,025,811 A * | 2/2000 | Canora | H01Q 1/36 343/793 |
| 6,940,264 B2 * | 9/2005 | Ryken, Jr. | G01R 21/12 324/117 R |
| 2017/0040677 A1 * | 2/2017 | Martinez Ortigosa | H01Q 5/335 |

FOREIGN PATENT DOCUMENTS

CN　　　　203277630 U　　　11/2013

* cited by examiner

*Primary Examiner* — Andrea Lindgren Baltzell (57) ABSTRACT

One example discloses a near-field circuit configured to be coupled to a near-field antenna wherein the near-field antenna includes, a first conductive structure, a second conductive structure, a first feeding connection, and a second feeding connection, wherein the conductive structures are configured to transmit and/or receive non-propagating quasi-static electric (E) field signals, the near-field circuit including: a transmit circuit having a first coupling connection and a second coupling connection; a voltage boost circuit configured to be coupled in series between the first coupling connection of the transmit circuit and the first feeding connection of the near-field antenna; wherein the second coupling connection of the transmit circuit is configured to be coupled to the second feeding connection of the near-field antenna.

19 Claims, 8 Drawing Sheets

NEAR-FIELD INDUCTION VOLTAGE BOOST CIRCUIT

The present specification relates to systems, methods, apparatuses, devices, articles of manufacture and instructions for near-field communication.

SUMMARY

According to an example embodiment, a near-field circuit configured to be coupled to a near-field antenna wherein the near-field antenna includes, a first conductive structure, a second conductive structure, a first feeding connection, and a second feeding connection, wherein the conductive structures are configured to transmit and/or receive non-propagating quasi-static electric (E) field signals, the near-field circuit comprising: a transmit circuit having a first coupling connection and a second coupling connection; a voltage boost circuit configured to be coupled in series between the first coupling connection of the transmit circuit and the first feeding connection of the near-field antenna; wherein the second coupling connection of the transmit circuit is configured to be coupled to the second feeding connection of the near-field antenna.

In another example embodiment, the first conductive structure and the second conductive structure together form a short loaded dipole electric near-field antenna.

In another example embodiment, the voltage boost circuit is a capacitor; one end of the capacitor is coupled to the first coupling connection of the transmit circuit; and another end of the capacitor is configured to be coupled to the first feeding connection of the near-field antenna.

In another example embodiment, a voltage between the first conductive structure and the second conductive structure is, $Vant = V_{RFIC}(Ct+Ck)/Ck$; and, Vant = a voltage between the first and second conductive structures, $V_{RFIC}$ = an output voltage of the near-field circuit, Ct = a tuning capacitance in the near-field circuit, and Ck = a capacitance of the voltage boost circuit capacitor.

In another example embodiment, further comprising a tuning circuit having a tuning capacitance configured to adjust a resonance frequency and/or bandwidth of the near-field antenna.

In another example embodiment, the tuning capacitance is equal to or greater than the voltage boost circuit capacitance.

In another example embodiment, a ratio of the voltage boost circuit capacitance to the tuning capacitance is configured to adjust a voltage gain between the near-field circuit and the near-field antenna.

In another example embodiment, the voltage boost circuit is an amplifier configured to adjust a voltage gain between the near-field circuit and the near-field antenna.

In another example embodiment, the voltage boost circuit is a negative impedance element configured to adjust a voltage gain between the near-field circuit and the near-field antenna.

In another example embodiment, the voltage boost circuit a negative coil configured to adjust a voltage gain between the near-field circuit and the near-field antenna.

In another example embodiment, the voltage boost circuit is physically positioned closer to the transmit circuit than the near-field antenna.

In another example embodiment, the near-field antenna is an electric induction (NFEI) antenna.

In another example embodiment, the near-field antenna further includes, a first magnetic coil coupled to the first conductive structure and the first feeding connection; and the first magnetic coil is configured to transmit and/or receive non-propagating quasi-static magnetic (H) field signals.

In another example embodiment, the near-field antenna is an electromagnetic induction (NFEMI) antenna.

In another example embodiment, further comprising a tuning circuit having a tuning capacitance and tuning resistor configured to adjust a resonance frequency and/or bandwidth of the near-field antenna; wherein the voltage boost circuit is configured to provide a voltage gain between the near-field circuit and the near-field antenna; wherein the first magnetic coil includes an inductance having a tolerance variation; and wherein a maximum value of the voltage gain is limited by a maximum value of the tuning capacitance and the tolerance variation of the first magnetic coil inductance.

In another example embodiment, the voltage boost circuit includes a variable capacitance; and the maximum value of the voltage gain is set based on the variable capacitance.

In another example embodiment, the near-field antenna further includes, a first magnetic coil and a second magnetic coil; the first magnetic coil is coupled between the first feeding connection and the second feeding connection; the second magnetic coil is coupled between the first feeding connection and the first conductive structure; the first and second magnetic coils are coupled in series; and the first and second magnetic coils are configured to transmit and/or receive non-propagating quasi-static magnetic (H) field signals.

In another example embodiment, the voltage boost circuit is a capacitor; one end of the capacitor is coupled to the first coupling connection of the transmit circuit; another end of the capacitor is configured to be coupled to the first feeding connection of the near-field antenna; a voltage between the first conductive structure and the second conductive structure is Vant=Vcoil+k Vcoil; and, $Vcoil = V_{RFIC}(Ct+Ck)/Ck$, $k = M\sqrt{L1*L2}$, Vant is a voltage between the first and second conductive structures, Vcoil = a voltage across the first magnetic coil, k = a magnetic coupling factor between the first magnetic coil and the second magnetic coil, L1 = an inductance of the first magnetic coil, L2 = an inductance of the second magnetic coil, M = a mutual inductance between the first and second magnetic coils, $V_{RFIC}$ = an output voltage of the near-field circuit, Ct = a tuning capacitance in the near-field circuit, and Ck = a capacitance of the voltage boost circuit capacitor.

According to an example embodiment, a near-field device, comprising: a near-field antenna including, a first conductive structure; a second conductive structure; a first feeding connection; and a second feeding connection;

wherein the conductive structures are configured to transmit and/or receive non-propagating quasi-static electric (E) field signals; a transmit circuit having a first coupling connection and a second coupling connection; and a voltage boost circuit coupled in series between the first coupling connection of the transmit circuit and the first feeding connection of the near-field antenna; wherein the second coupling connection of the transmit circuit is coupled to the second feeding connection of the near-field antenna.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Herein discussed are communication and other wireless networked devices based on near-field electromagnetic induction (NFEMI), where the transmitter and receiver are coupled by both magnetic (H) and electric (E) fields. While RF wireless communication is accomplished by propagating an RF plane wave through free space, NFEMI communication utilizes non-propagating quasi-static H and E fields which in some example embodiments follow a human body contour and substantially reduce far-field radiation if operated at frequencies below 50 MHz.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space. Small antenna geometries minimize radiating waves in free space.

Some wearables, such as hearing aids and wireless earbuds, employ Near-Field Magnetic Induction (NFMI) as a wireless communication method. In NFMI wireless communication, two loosely coupled coils realize signal transfer. No radiation of radio waves takes place. A current flowing in the transmission coil generates a H-field which in turn induces a current in the receiving coil. In this way, wireless communication is accomplished.

Other wearables employ Near-field Electric Induction (NFEI)) as a wireless communication method. NFEI allows electronic devices on and near a conductive structure (e.g. a human body) to exchange information through E-field coupling (e.g. at 21 MHz). NFEI is also sometimes called Body Coupled Communication (BCC).

Improving a robustness of such near-field communications is desired. Circuits, structures, and tuning methods for accomplishing this goal are now discussed.

Figure 1A:
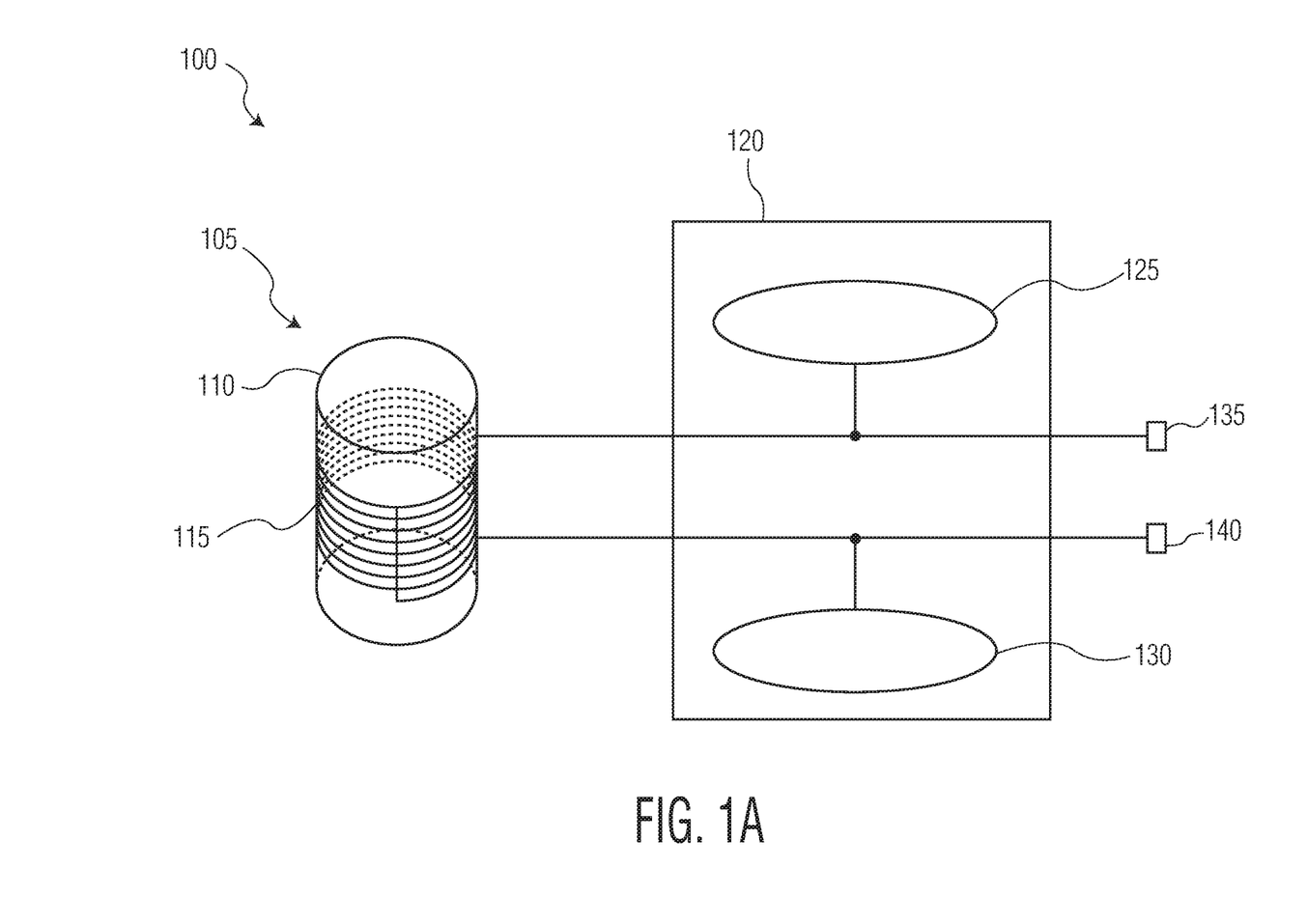
FIG. 1A is an example idealized single coil near-field electromagnetic induction (NFEMI) antenna.

FIG. 1A is an example idealized single coil near-field electromagnetic induction (NFEMI) antenna 100. The antenna 100 in this example is an electromagnetic induction (NFEMI) antenna, however alternate embodiments can be an NFEI antenna. In some example embodiments, the antenna 100 includes a coil (H-field) antenna 105 for magnetic fields, in conjunction with a short loaded dipole (E-field) antenna 120 for electric fields. The H-field antenna 105 includes a ferrite core 110 wound with wire 115. The E-field antenna 120 includes two conductive structures 125 and 130 (e.g. loading plates). Antenna 100 feed connections 135, 140 are coupled to various transceiver circuitry, such as downstream radio transmitter and receiver integrated circuit (RFIC) 150 (e.g. transmit and/or receive circuit) (see FIG. 1B).

When the NFEMI antenna 100 is proximate to a structure (e.g. a conductive structure, a body, a person, an object, etc.) the magnetic and electric fields will be substantially confined to the structure and not significantly radiate in free-space. This enhances security and privacy of such body networked communications.

In various example embodiments, the antenna 100 operates at or below 50 MHz (e.g. for example at 30 MHz) to ensure that the fields are following the structure's contours and to ensure that far field radiation is strongly reduced.

Figure 1B:
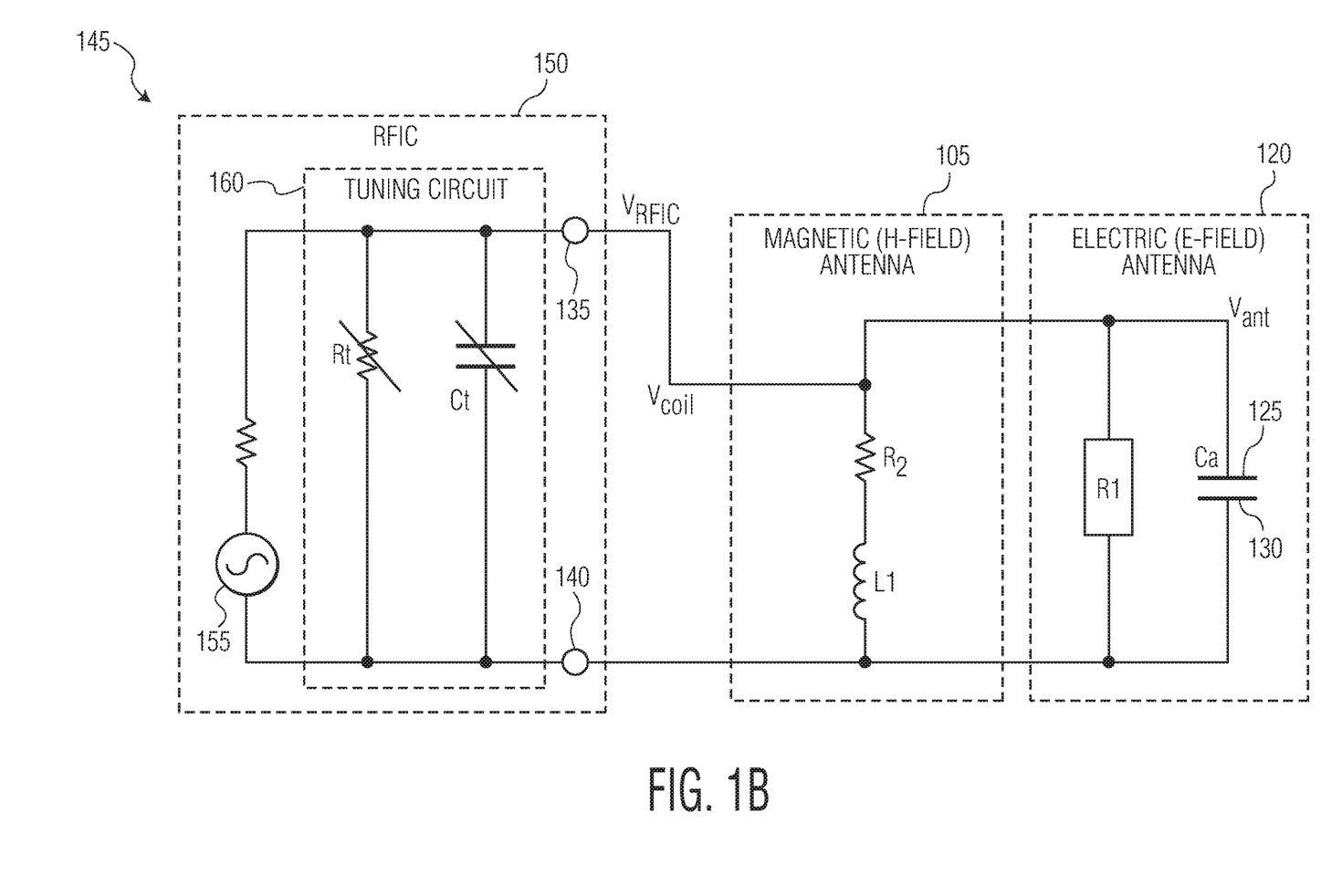
FIG. 1B is an example RFIC circuit coupled to the single coil NFEMI antenna.

FIG. 1B is an example 145 RFIC circuit 150 (e.g. transmit and/or receive circuit) coupled to the single coil NFEMI antenna 100. In this example 145, only the RFIC's 150 transmit circuitry is shown, however the RFIC 150 also includes receive circuitry having a low noise amplifier (LNA).

Voltage $V_{RFIC}$ at feed connection 135 in the transmit mode is a transmit voltage (Vtx) generated by a voltage source 155 in the RFIC circuit 150. In this example embodiment, the transmit voltage on the coil antenna 105 (i.e. Vcoil) and the transmit voltage on the dipole antenna 120 (i.e. Vant) are the same as $V_{RFIC}$ (i.e. Vtx).

Vcoil across the small loop antenna 105 generates a current through coil L1. R2 is the loss resistance of the coil L1. Current through the coil L1 generates a magnetic (H) field. The H-field is a linear function of the current through the coil L1. The voltage across the short loaded dipole 120 charges the conductive structures 125, 130 and generates an electric (E) field between the conductive structures 125, 130 and its environment. The generated electric field is a linear function of the Vant voltage across the conductive structures 125, 130. Both the H-field and E-field are quasi static in nature and do not substantially radiate in the far-field.

Figure 2A:
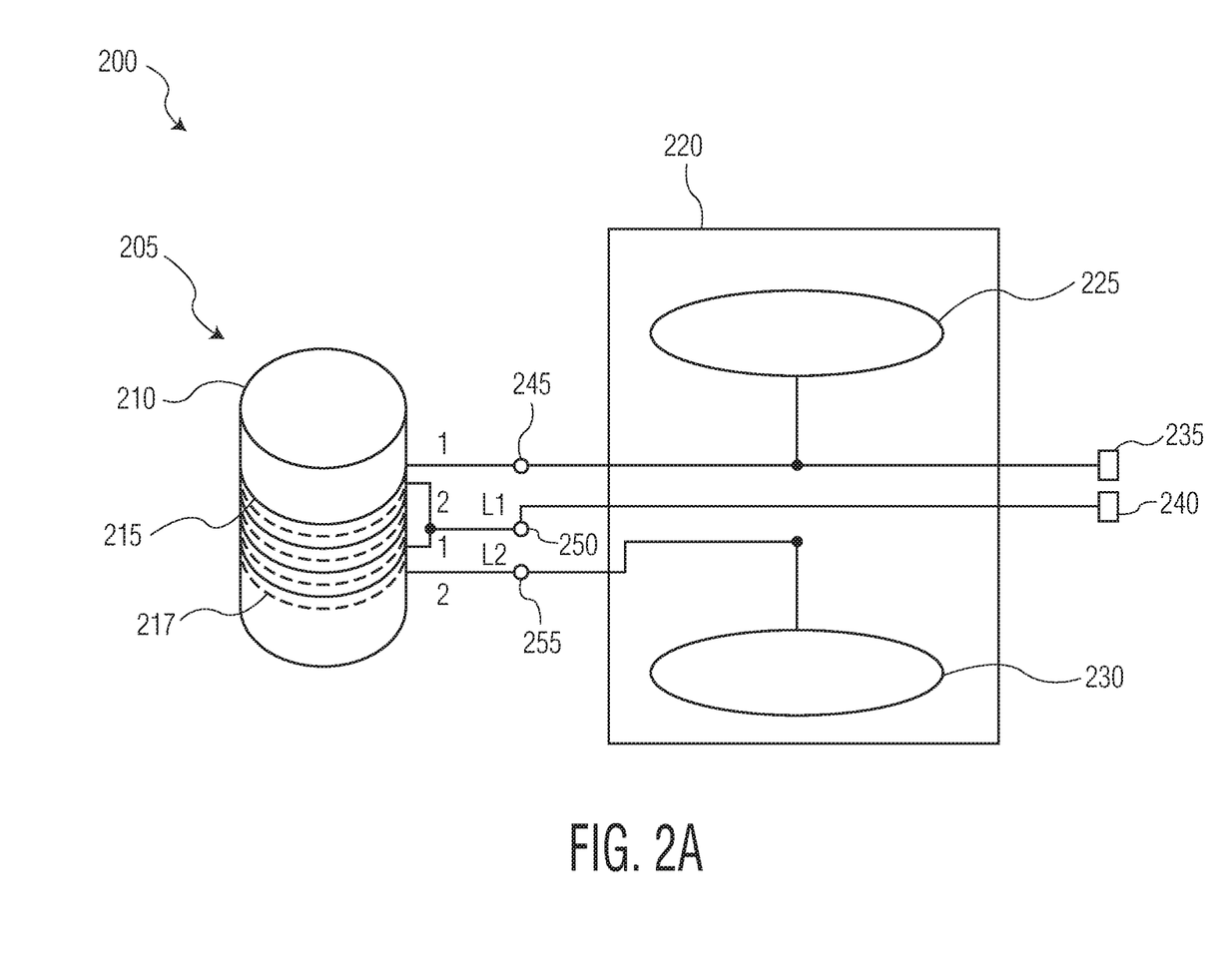
FIG. 2A is an example idealized dual coil NFEMI antenna.

FIG. 2A is an example idealized dual coil NFEMI antenna 200. The antenna 200 includes a short loaded dipole 220 with two conductive structures 225, 230 (e.g. loading plates) and a small loop coil antenna 205.

The small loop antenna 205 includes at least two coupled coils 215 and 217. The first coil 215 has an inductance of L1, and the second coil 217 has an inductance of L2. Both coils 215 and 217 may be connected, at connection 250, such that they form a larger inductance compared with the inductance of the first coil 215 and the second coil 217. In some example embodiments, both coils 215 and 217 are air coils, or wrapped around a ferrite core 210, while in other example embodiments they are planar and on a substrate.

In the ferrite core 210 embodiment, the coils 215 and 217 may be wrapped around the core 210 in an interleaved fashion, or wrapped on top of one another, i.e., the second coil 217 is first wrapped around the core 210, and then the first coil 215 is then wrapped around the core 210 on top of the second coil 217.

Connection 245 couples one end of the first coil 215 to a first feeding connection 235 and to the first conductive structure 225 of the short loaded dipole 220. Connection 250 couples another end of the first coil 215 to one end of the second coil 217 and to a second feeding connection 240. Connection 255 couples another end of the second coil 217 to the second structure 230 of the short loaded dipole 220.

Figure 2B:
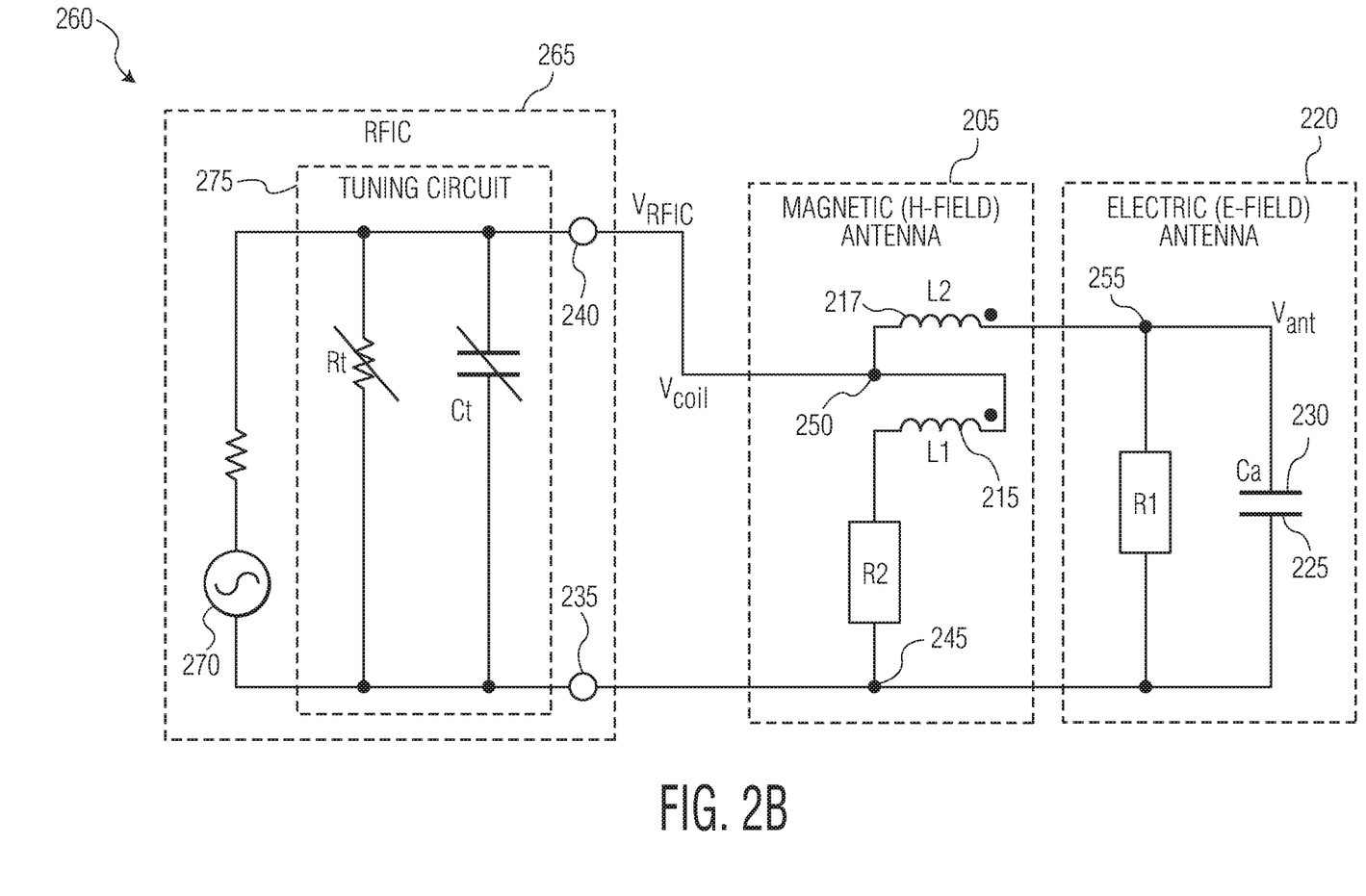
FIG. 2B is an example RFIC circuit coupled to the dual coil NFEMI antenna.

FIG. 2B is an example 260 RFIC circuit 265 (e.g. transmit and/or receive circuit) coupled to the dual coil NFEMI antenna 200. In this example 260, only the RFIC's 265 transmit circuitry is shown, however the RFIC 265 also includes receive circuitry having a low noise amplifier (LNA).

Voltage $V_{RFIC}$ at feed connection 240 in the transmit mode is a transmit voltage (Vtx) generated by a voltage source 270 in the RFIC circuit 265. In this example embodiment, the transmit voltage on the coil antenna 205 (i.e. Vcoil) and the transmit voltage on the dipole antenna 220 (i.e. Vant) are not the same as $V_{RFIC}$ (i.e. Vtx) due to the presence of the second coil 217 (L2), as is discussed further below.

Vcoil across the small loop antenna 205 generates a current through coil L1. R2 is the loss resistance of the coil L1 and coil L2 together. Current through the coil L1 generates a magnetic (H) field. The H-field is a linear function of the current through the coil L1.

The voltage Vant across the short-loaded dipole 220 electric induction antenna is higher than Vcoil since Vcoil is applied between coil 215 (L1) and coil 217 (L2) and coil 217 (L2) further increases Vcoil according to the following equations:

$$Vant = Vcoil + k \, Vcoil$$

$$k = M\sqrt{L1 * L2}$$

Where:

Vant=voltage across the short dipole 220 electric antenna;

Vcoil=voltage on coil L1 k=magnetic coupling factor between the coil 215 (L1) and coil 217 (L2)

L1=inductance of coil 215

L2=inductance of coil 217

M=mutual inductance between coil 215 (L1) and coil 217 (L2)

The voltage Vant across the short loaded dipole 220 charges the conductive structures 225, 230 and generates an electric (E) field between the conductive structures 225, 230 and its environment. The generated electric field is a linear function of the Vant voltage across the conductive structures 225, 230 and thus a higher electric field is created for the same Vcoil (e.g. Vtx) voltage. Both the H-field and E-field are quasi static in nature and do not substantially radiate in the far-field.

In example embodiments where coil 215 (L1) and coil 217 (L2) are similar and strongly magnetically coupled (k=0.99), the voltage Vant at the short-loaded dipole will be twice the voltage on coil 215 (L1) when the reactance of the dipole antenna is much larger as the reactance of the coil 217 (L2). Note: E, where: E=Electric field [Volts/meter].

So while the NFEMI or NFEI circuits and antenna's communication range and link budget may be increased by increasing Vant at the short loaded dipole 220 electrical field antenna, for some low power circuits and devices their $V_{RFIC}$ voltage is limited. For example, some semiconductor circuits have ESD, loss and voltage limitations (e.g. a $V_{RFIC}$ of 6 Volts and likely lower in the future). Such voltage reductions may impede some near-field example embodiments.

Now discussed is an additional voltage boost circuit to help further address $V_{RFIC}$ voltage limitations. The voltage boost circuit to be discussed generates an even higher Vant and thus electric field from the short loaded dipole 220 and thus an improved range and robustness of near-field communication.

Figure 3A:
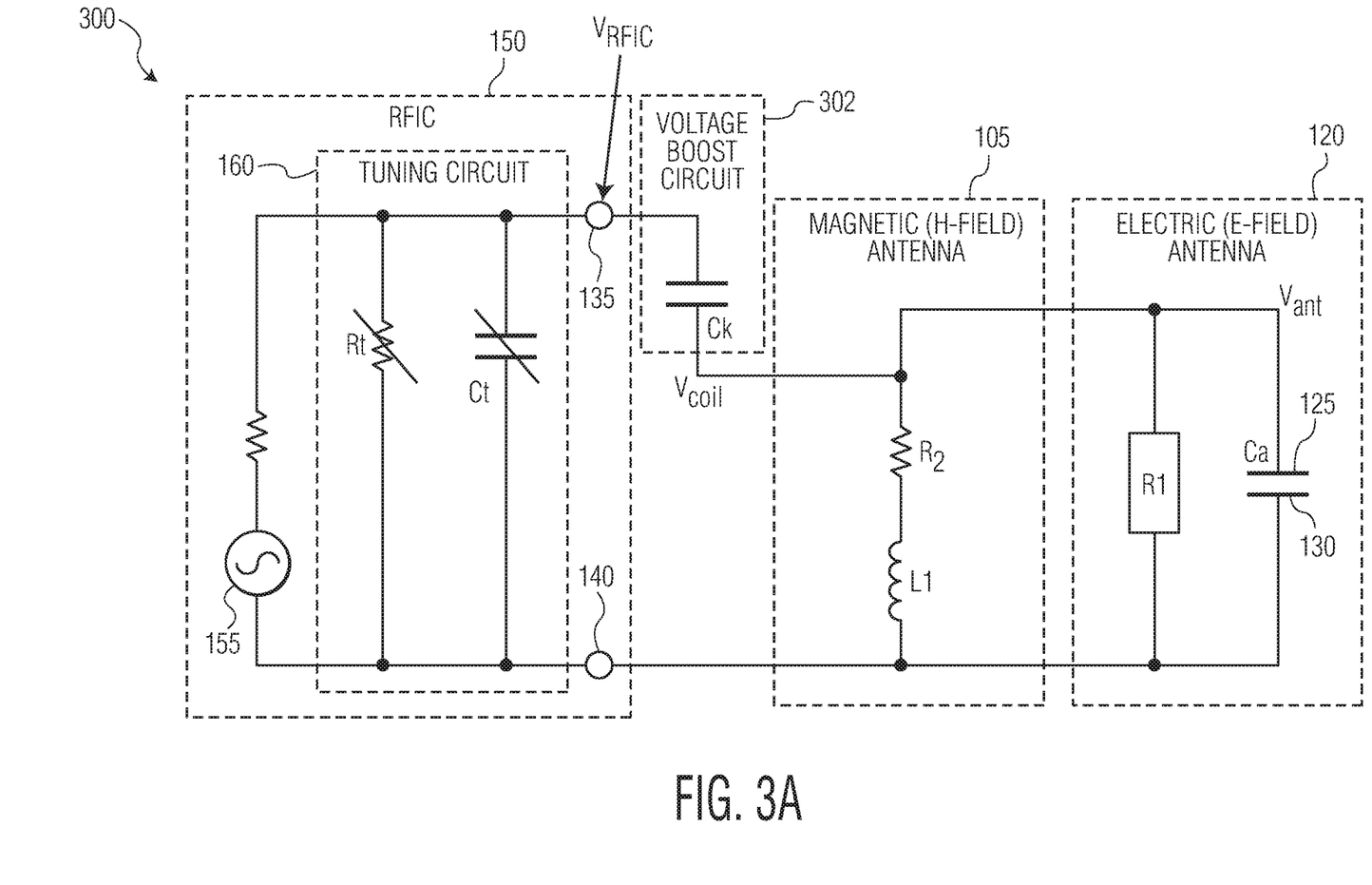
FIG. 3A is an example voltage boost circuit coupled to the RFIC circuit of FIG. 1B and the single coil NFEMI antenna.

FIG. 3A is an example 300 voltage boost circuit 302 coupled to the RFIC circuit 150 of FIG. 1B and the single coil NFEMI antenna 105, 120.

Voltage $V_{RFIC}$ at feed connection 135 in the transmit mode is the transmit voltage (Vtx) generated by the voltage source 155 in the RFIC circuit 150. However, in contrast to the example 145 in FIG. 1B, in this example embodiment, the transmit voltage on the coil antenna 105 (i.e. Vcoil) and the transmit voltage on the dipole antenna 120 (i.e. Vant) are not the same as $V_{RFIC}$ (i.e. Vtx).

In this example 300 the voltage $V_{RFIC}$ at feed connection 135 is applied to the voltage boost circuit 302. In some example embodiments the voltage boost circuit 302 is a capacitor Ck, while in other example embodiments the voltage boost circuit 302 could be: an amplifier, a negative impedance element, or a negative coil. For example, the Linville negative coil convertor. In some example embodiments the voltage boost circuit 320 is positioned as close to the RFIC 265 as possible.

Because of the voltage boost circuit 302, the voltage Vcoil across the coil L1 in the coil (H-field) antenna 105 is boosted higher than $V_{RFIC}$. As a result Vcoil which equals Vant in this example embodiment is also higher than in the FIG. 1B non-boosted example embodiment and generates a stronger electric (E) field from the conductive structures 125, 130.

The voltage Vant across the short-loaded dipole 120 is:

Vant=Vcoil=$V_{RFIC}$ (Ct+Ck)/Ck

Where:

Vant=voltage across the short dipole 120

Vcoil=voltage on coil L1

$V_{RFIC}$=RFIC output voltage

Ct=tuning capacitor

Ck=coupling capacitor

Figure 3B:
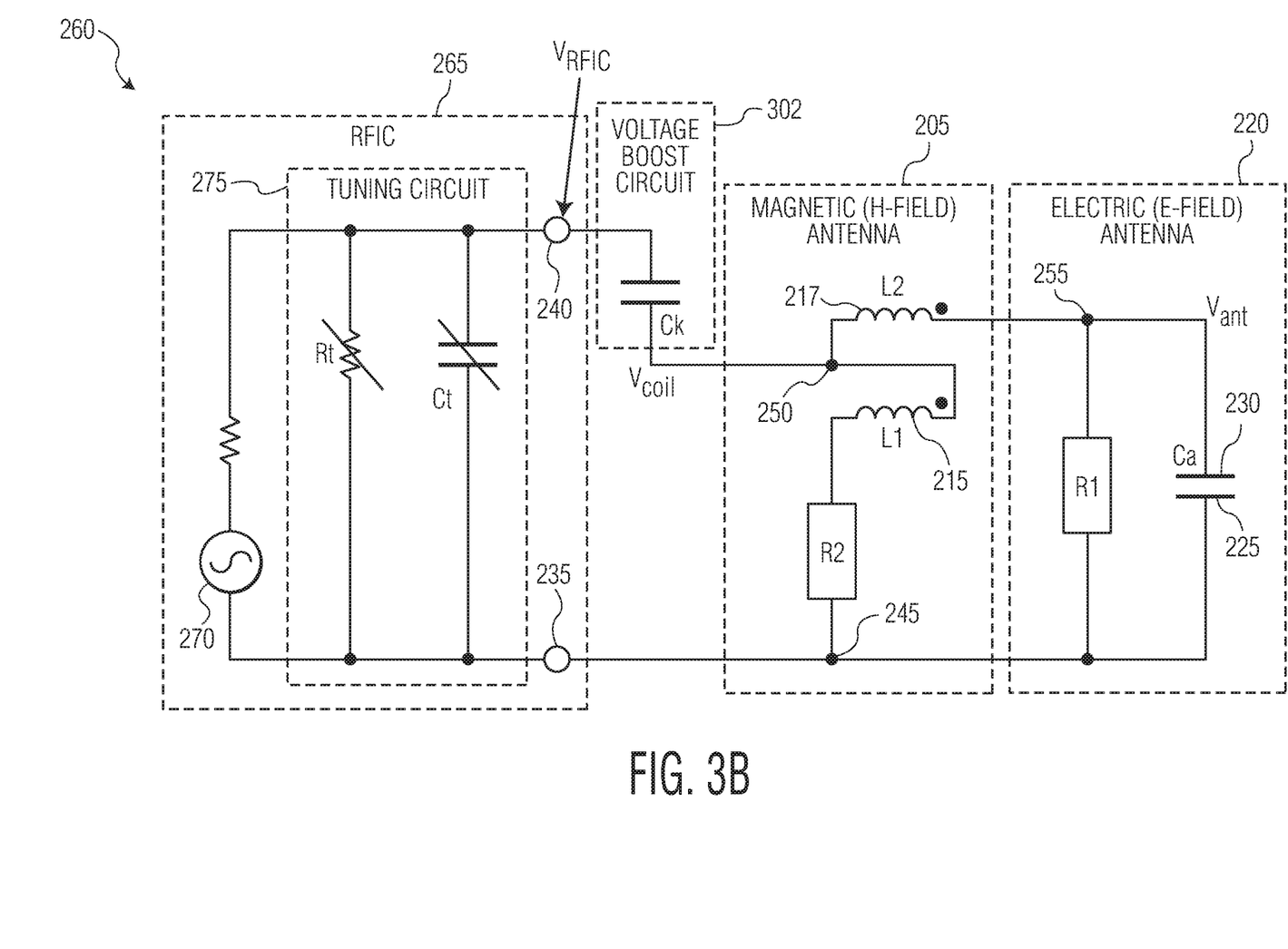
FIG. 3B is an example of the voltage boost circuit coupled to the RFIC circuit of FIG. 2B and the dual coil NFEMI antenna.

FIG. 3B is an example 304 of the voltage boost circuit 302 coupled to the RFIC circuit of FIG. 2B and the dual coil NFEMI antenna 205, 220.

Voltage $V_{RFIC}$ at feed connection 240 in the transmit mode is the transmit voltage (Vtx) generated by the voltage source 270 in the RFIC circuit 265. However, in contrast to the example 260 in FIG. 2B, in this example embodiment, the transmit voltage on the coil antenna 205 (i.e. Vcoil) and the transmit voltage on the dipole antenna 220 (i.e. Vant) are not the same as $V_{RFIC}$ (i.e. Vtx).

In this example 304 the voltage $V_{RFIC}$ at feed connection 240 is also applied to the voltage boost circuit 302. As mentioned above, in some example embodiments the voltage boost circuit 302 is a capacitor Ck, while in other example embodiments the voltage boost circuit 302 could be: an amplifier, a negative impedance element, or a negative coil.

Because of the voltage boost circuit 302, the voltage Vcoil across the coil 215 (L1) in the coil (H-field) antenna 205 is boosted higher than $V_{RFIC}$. The voltage Vant across the short-loaded dipole 220 electric induction antenna is even higher than Vcoil since Vcoil is applied between coil 215 (L1) and coil 217 (L2) and coil 217 (L2) further increases Vcoil. Thus Vant is effectively boosted twice.

Since coil 215 (L1) and coil 217 (L2) are coupled and in a series arrangement, the voltage Vant across the short-loaded dipole 220 is:

Vcoil=$V_{RFIC}$ (Ct+Ck)/Ck

Vant=Vcoil+k Vcoil k=M$\sqrt{L1*L2}$

Where:

Vant=voltage across the short dipole 220 electric antenna;

Vcoil=voltage on coil 215 (L1)

k=magnetic coupling factor between the coil 215 (L1) and coil 217 (L2)

L1=inductance of coil 215

L2=inductance of coil 217

M=mutual inductance between coil 215 (L1) and coil 217 (L2)

$V_{RFIC}$=RFIC output voltage

Ct=tuning capacitor

Ck=coupling capacitor

In example embodiments where the tuning capacitance Ct and the coupling capacitance Ck are similar, the voltage at the coil 215 (L1) is twice the $V_{RFIC}$ voltage. With coil 215 (L1) and coil 217 (L2) similar and strongly magnetically coupled (k=0.99), the voltage at the short-loaded dipole 220 will be twice the voltage on coil 215 (L1), resulting in an overall voltage gain of four times over the $V_{RFIC}$ voltage.

Thus in one example embodiment, the RFIC circuit 265 is configured to output a 6 volt transmit signal to the voltage boost circuit 302. The voltage boost circuit 302 boosts the transmit signal to 12 volts. The 12 volt Vcoil boost signal is applied across the coil 215 (L1). The coil 217 (L2) then further boosts the signal Vant across the E-field conductive structures 225, 230 to 24 volts resulting in a robust transmit signal for NFEMI communications. This boosting of the VRFIC transmit voltage is likely to be even more important if NFEMI tuning circuit voltages are lowered (e.g. from 6V to 3V) in future NFEMI products due to wafer fabrication ESD and other limitations.

In some example embodiments using capacitor Ck, keeping capacitance Ck as small as possible results in a highest voltage boost sent to the short loaded dipole 220 antenna.

Using the voltage boost circuit 302 there is no change in reception sensitivity in either the single coil NFEMI antenna device 100 or the dual coil NFEMI antenna device 200. Thus the voltage boost circuit 302 increases gain in a transmit TX mode, but does not reduce gain in a receive RX mode.

Due to the impedance multiplication effects of the voltage boost circuit 302 (e.g. since the voltage boost circuit 320 blocks Ct from L1), the boosted antenna devices 100, 200 may be more sensitive to manufacturing tolerance variations in L1, which can be +/−10% or more.

For example, the tuning circuit's 275 ability to tune the NFEMI device's 200 resonance frequency (e.g. to 10.6 MHz+/−12.5 kHz) may not be large enough to compensate for coil 215 (L1) tolerance variations. Coil 215 (L1) can also vary depending upon where the NFEMI device 200 is positioned with respect to other structures (e.g. where worn on a human body). Thus in some example embodiments, the voltage boost circuit 302 is itself adjustable either dynamically with a controller, or during manufacture to restore the tuning circuit's 275 ability to properly control of the NFEMI device's 200 resonance frequency.

For example, if the voltage boost circuit 302 is a capacitance (Ck), then Ck can be varied by: including a controller for dynamically selecting between a set of Ck capacitors or tuning a single Ck capacitor. Such a controller would enable the device 200 to be better tuned for applications with multiple resonance frequencies.

If however there is just one resonance frequency, Ck capacitor can be selected/tuned just once during manufacture and is set based on coil 215 (L1) and an anticipated variations in a capacitance Ca of the conductive structures 225, 230 in the short loaded dipole 220.

Figure 4:
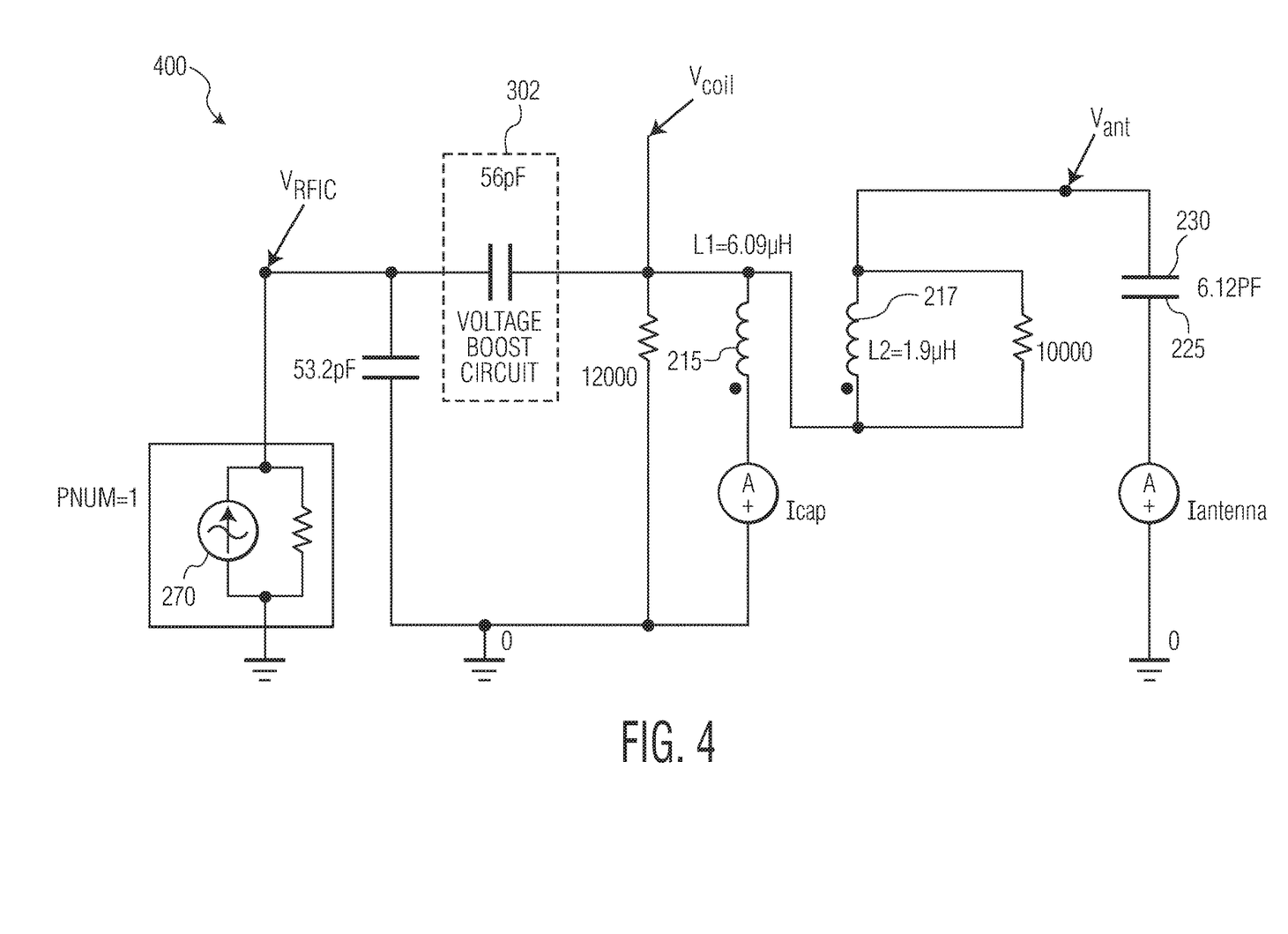
FIG. 4 is an example simulated circuit including the voltage boost circuit coupled to the RFIC circuit and the dual coil NFEMI antenna.

FIG. 4 is an example 400 simulated circuit including the voltage boost circuit 302 coupled to an RFIC circuit and the dual coil NFEMI antenna 200. In this example, a tuning capacitor in the RFIC circuit is set to 53.2 pF, Resistance 12000 is a total loss including a resistor bank in the RFIC circuit's tuning bank, and a capacitance of the conductive structures 225, 230 in the short loaded dipole 220 is 6.12 pF.

Figure 5:
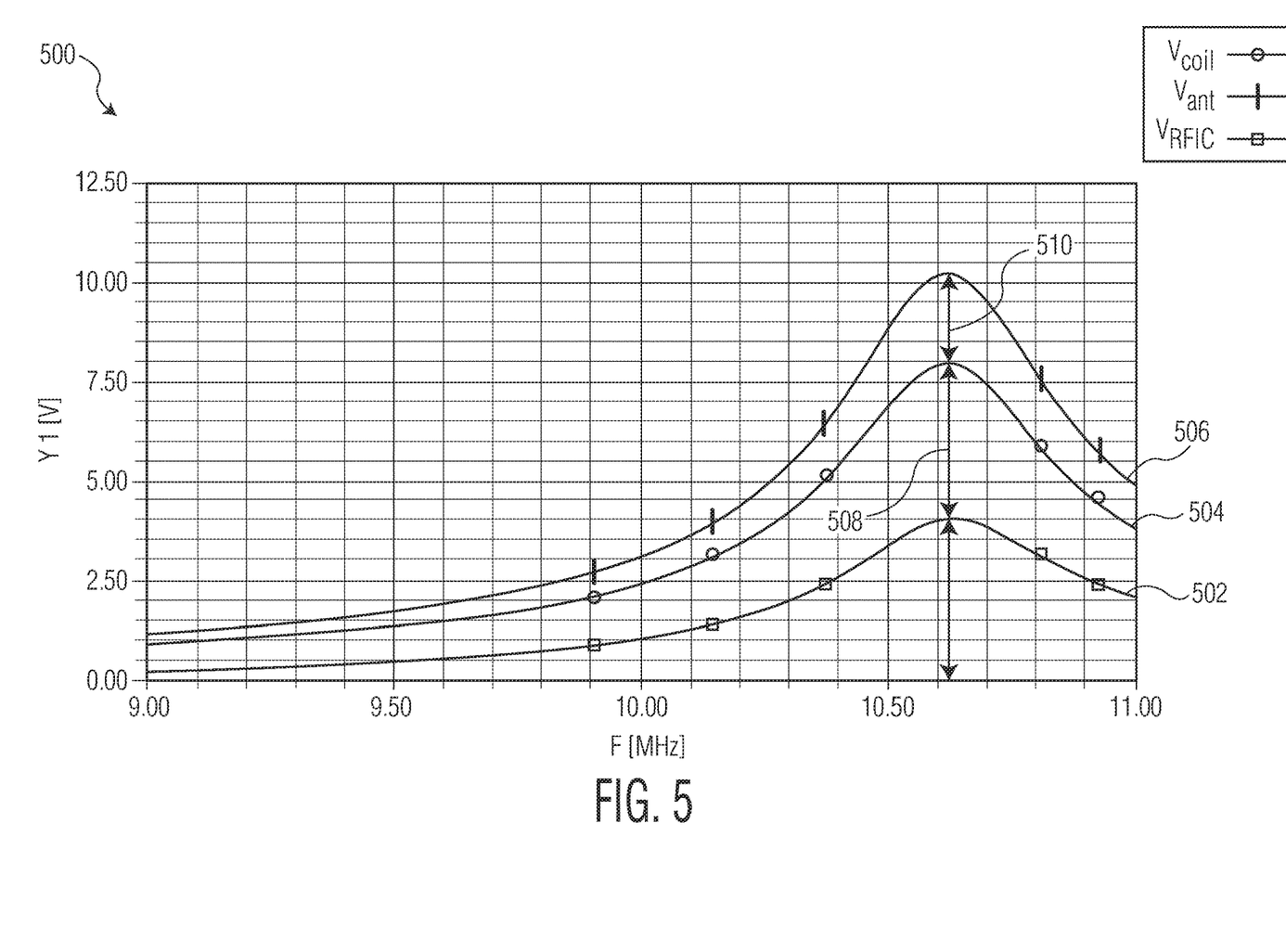
FIG. 5 is an example set of voltages corresponding to the simulated circuit shown in FIG. 4.

FIG. 5 is an example 500 set of voltages corresponding to the simulated circuit shown in FIG. 4. Show are: $V_{RFIC}$ 502, Vcoil 504, Vant 506, voltage boost circuit 320 increase 508, and second coil 217 (L2) increase 510. Thus even if $V_{RFIC}$ is only 4 V, Vant would be much higher at 10.2 Volts.

In various example embodiments, the near-field communication circuits and antennas are included in various wireless communication products, perhaps having applications near a human body, such as in: consumer lifestyle, personal healthcare area and body networking products.

In various example embodiments, the near-field communication circuits and antennas may be in a balanced or single ended configuration. The near-field communication circuits and antennas may in various example embodiments, may have a planar or spiral shape. The near-field communication circuits and antennas in various example embodiments may be part of a wireless wearable device, a hearing aid, an earbud, a smart watch, or a smart phone.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transient computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transient machine or computer-usable media or mediums as defined herein excludes signals, but such media or mediums may be capable of receiving and processing information from signals and/or other transient mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A near-field circuit configured to be coupled to a near-field antenna wherein the near-field antenna includes, a first conductive structure, a second conductive structure, a first feeding connection, and a second feeding connection, wherein the conductive structures are configured to transmit and/or receive non-propagating quasi-static electric (E) field signals, the near-field circuit comprising:
a transmit circuit having a first coupling connection and a second coupling connection;
a voltage boost circuit configured to be coupled in series between the first coupling connection of the transmit circuit and the first feeding connection of the near-field antenna;
wherein the second coupling connection of the transmit circuit is configured to be coupled to the second feeding connection of the near-field antenna.

2. The circuit of claim 1:
wherein the first conductive structure and the second conductive structure together form a short loaded dipole electric near-field antenna.

3. The circuit of claim 1:
wherein the voltage boost circuit is a capacitor;
wherein one end of the capacitor is coupled to the first coupling connection of the transmit circuit; and
wherein another end of the capacitor is configured to be coupled to the first feeding connection of the near-field antenna.

4. The circuit of claim 3:
wherein a voltage between the first conductive structure and the second conductive structure is, Vant=$V_{RFIC}$(Ct+Ck)/Ck; and
wherein, Vant=a voltage between the first and second conductive structures, $V_{RFIC}$=an output voltage of the near-field circuit, Ct=a tuning capacitance in the near-field circuit, and Ck=a capacitance of the voltage boost circuit capacitor.

5. The circuit of claim 3:
further comprising a tuning circuit having a tuning capacitance configured to adjust a resonance frequency and/or bandwidth of the near-field antenna.

6. The circuit of claim 5:
wherein the tuning capacitance is equal to or greater than the voltage boost circuit capacitance.

7. The circuit of claim 5:
wherein a ratio of the voltage boost circuit capacitance to the tuning capacitance is configured to adjust a voltage gain between the near-field circuit and the near-field antenna.

8. The circuit of claim 1:
wherein the voltage boost circuit is an amplifier configured to adjust a voltage gain between the near-field circuit and the near-field antenna.

9. The circuit of claim 1:
wherein the voltage boost circuit is a negative impedance element configured to adjust a voltage gain between the near-field circuit and the near-field antenna.

10. The circuit of claim 1:
wherein the voltage boost circuit a negative coil configured to adjust a voltage gain between the near-field circuit and the near-field antenna.

11. The circuit of claim 1:
wherein the voltage boost circuit is physically positioned closer to the transmit circuit than the near-field antenna.

12. The circuit of claim 1:
wherein the near-field antenna is an electric induction (NFEI) antenna.

13. The circuit of claim 1:
wherein the near-field antenna further includes, a first magnetic coil coupled to the first conductive structure and the first feeding connection; and
wherein the first magnetic coil is configured to transmit and/or receive non-propagating quasi-static magnetic (H) field signals.

14. The circuit of claim 13:
wherein the near-field antenna is an electromagnetic induction (NFEMI) antenna.

15. The circuit of claim 13:
further comprising a tuning circuit having a tuning capacitance and tuning resistor configured to adjust a resonance frequency and/or bandwidth of the near-field antenna;
wherein the voltage boost circuit is configured to provide a voltage gain between the near-field circuit and the near-field antenna;
wherein the first magnetic coil includes an inductance having a tolerance variation; and
wherein a maximum value of the voltage gain is limited by a maximum value of the tuning capacitance and the tolerance variation of the first magnetic coil inductance.

16. The circuit of claim 15:
wherein the voltage boost circuit includes a variable capacitance; and
wherein the maximum value of the voltage gain is set based on the variable capacitance.

17. The circuit of claim 1:
wherein the near-field antenna further includes, a first magnetic coil and a second magnetic coil;
wherein the first magnetic coil is coupled between the first feeding connection and the second feeding connection;
wherein the second magnetic coil is coupled between the first feeding connection and the first conductive structure;
wherein the first and second magnetic coils are coupled in series; and
wherein the first and second magnetic coils are configured to transmit and/or receive non-propagating quasi-static magnetic (H) field signals.

18. The circuit of claim 17:
wherein the voltage boost circuit is a capacitor;
wherein one end of the capacitor is coupled to the first coupling connection of the transmit circuit;
wherein another end of the capacitor is configured to be coupled to the first feeding connection of the near-field antenna;
wherein a voltage between the first conductive structure and the second conductive structure is Vant=Vcoil+k Vcoil; and
wherein, Vcoil=$V_{RFIC}$(Ct+Ck)/Ck, k=M$\sqrt{L1*L2}$, Vant is a voltage between the first and second conductive structures, Vcoil=a voltage across the first magnetic coil, k=a magnetic coupling factor between the first magnetic coil and the second magnetic coil, L1=an inductance of the first magnetic coil, L2=an inductance of the second magnetic coil, M=a mutual inductance between the first and second magnetic coils, $V_{RFIC}$=an output voltage of the near-field circuit, Ct=a tuning capacitance in the near-field circuit, and Ck=a capacitance of the voltage boost circuit capacitor.

19. A near-field device, comprising:
a near-field antenna including,
 a first conductive structure;
 a second conductive structure;
 a first feeding connection; and
 a second feeding connection;
wherein the conductive structures are configured to transmit and/or receive non-propagating quasi-static electric (E) field signals;
a transmit circuit having a first coupling connection and a second coupling connection; and
a voltage boost circuit coupled in series between the first coupling connection of the transmit circuit and the first feeding connection of the near-field antenna;
wherein the second coupling connection of the transmit circuit is coupled to the second feeding connection of the near-field antenna.

* * * * *